United States Patent
Hoeglinger et al.

(10) Patent No.: US 10,606,239 B2
(45) Date of Patent: Mar. 31, 2020

(54) SHAPING PLANT AND SAFETY PROGRAM

(71) Applicant: ENGEL AUSTRIA GmbH, Schwertberg (AT)

(72) Inventors: Wolfgang Hoeglinger, Hoerschig (AT); Christian Huber, Ennsdorf (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 209 days.

(21) Appl. No.: 14/963,747

(22) Filed: Dec. 9, 2015

(65) Prior Publication Data
US 2016/0167277 A1   Jun. 16, 2016

(30) Foreign Application Priority Data
Dec. 12, 2014  (AT) .............................. A 50902/2014

(51) Int. Cl.
  *B29C 45/76*   (2006.01)
  *G05B 19/406*  (2006.01)
  *G05B 19/042*  (2006.01)

(52) U.S. Cl.
  CPC ....... *G05B 19/406* (2013.01); *G05B 19/0428* (2013.01); *G05B 2219/34465* (2013.01); *G05B 2219/45244* (2013.01)

(58) Field of Classification Search
  CPC ........................................ G05B 2219/34465
  USPC ....................................................... 700/197
  See application file for complete search history.

(56) References Cited

U.S. PATENT DOCUMENTS

| 7,269,468 B2 * | 9/2007 | Law .................... G05B 19/0426 700/86 |
| 7,869,889 B2 | 1/2011 | Flanders |
| 8,469,693 B2 | 6/2013 | Schad et al. |
| 2001/0015262 A1 | 8/2001 | Denpoh |
| 2005/0055111 A1 | 3/2005 | Law et al. |

(Continued)

FOREIGN PATENT DOCUMENTS

| CN | 1619443 | 5/2005 |
| CN | 101482736 | 7/2009 |

(Continued)

OTHER PUBLICATIONS

Omron Automation, "G9SP Safety Controller Basic Operations" by Omron Automation-Americas, Published Dec. 2, 2013, accessed at https://www.youtube.com/watch?v=QBYvuEt_QUU, 9 rains 20 sec, 2 Pages Print out (Year: 2013).*

(Continued)

*Primary Examiner* — Emilio J Saavedra
(74) *Attorney, Agent, or Firm* — Wenderoth, Lind & Ponack, L.L.P.

(57) ABSTRACT

A molding facility or peripheral apparatus for a molding facility including at least one non-safe control apparatus having at least one signal input and at least one signal output for the non-safe control of non-safety-relevant actuators of the molding facility or peripheral apparatus, and at least one safe control apparatus which has at least one safe signal input and at least one safe signal output and in which there is stored a safety program which can be executed for the safe control of safety-relevant actuators of the molding facility or peripheral apparatus, wherein the safety program is a version of a wiring diagram, that can be executed by the safe control apparatus and is compiled by a compiler.

22 Claims, 3 Drawing Sheets

(56) References Cited

U.S. PATENT DOCUMENTS

| | | | |
|---|---|---|---|
| 2007/0198108 A1* | 8/2007 | Nair | G05B 9/03 |
| | | | 700/83 |
| 2007/0239916 A1 | 10/2007 | Mashiko et al. | |
| 2009/0024230 A1* | 1/2009 | Hioka | G05B 19/0426 |
| | | | 700/17 |
| 2009/0030534 A1* | 1/2009 | Dold | G05B 19/0426 |
| | | | 700/83 |
| 2010/0004761 A1* | 1/2010 | Flanders | G05B 9/03 |
| | | | 700/28 |
| 2012/0052144 A1 | 3/2012 | Schad et al. | |
| 2015/0045914 A1* | 2/2015 | Saumer | G05B 9/02 |
| | | | 700/79 |

FOREIGN PATENT DOCUMENTS

| | | |
|---|---|---|
| CN | 102077453 | 5/2011 |
| CN | 203217346 | 9/2013 |
| DE | 10 2004 042 549 | 3/2005 |
| DE | 10 2005 046 686 | 4/2007 |
| DE | 102008002266 | 1/2009 |
| DE | 10 2011 122 337 | 6/2012 |
| WO | 2010/002464 | 1/2010 |
| WO | 2012/159207 | 11/2012 |

OTHER PUBLICATIONS

Search Report dated Jan. 27, 2017 in Austrian Application No. A 50902/2014, with English translation.
Search Report dated Nov. 6, 2017 in Chinese Patent Application No. 201511036270.9.

* cited by examiner

US 10,606,239 B2

SHAPING PLANT AND SAFETY PROGRAM

BACKGROUND OF THE INVENTION

1. Field of the Invention

The invention concerns a molding facility or a peripheral apparatus for a molding facility.

2. Description of the Related Art

In the molding facility and injection molding machine industry the entire subject of controls has already been becoming more and more important for years. In particular complexity of the control arrangements and the demands on user safety have increasingly risen. At the same time however the aim is that user-friendliness is not worsened, but if possible is even improved.

A general area in regard to almost any molding facility or almost any peripheral device for a molding facility is the so-called non-safe control device. That generally has at least one signal input and at least one signal output for non-safe control of actuators of the molding facility, that are not safety-relevant. Such actuators can be injection molding machines, safety doors, conveyor installations, handling robots, injection assemblies, separation assemblies, lift stations, metering installations, temperature control devices, tool heating means and so forth. In this connection it should be explained that "non-safe" does not mean that these would be "unsafe", rather that "non-safe" control apparatus involves lesser significance in regard to the safety criteria than the "safe" actuators which are also discussed hereinafter. The non-safe control apparatus is viewed at most as a tried-and-tested component and can comply with additional safety criteria of safety-relevant actuators by an implemented monitoring function—in that connection reference is made to the degree of diagnosis cover—but in no way can the non-safe control apparatus on its own ensure the safety of actuators in accordance with relevant standards like for example EN ISO 13849-1 or applicable machine guidelines RL2006/42/EC for the stated machines and installations. Comment: those standards are therefore relevant to safe control apparatuses and seek to ensure safe operation of the specified machines or installations while for non-safe control apparatuses only electromagnetic regulations (Electromagnetic Compatibility-Guideline RL 2004/108/EC) or the low voltage directive (LVD) RL2006/95/EC in general form are applicable.

This general area in relation to molding facilities also includes a computing unit on which there is configured a user interface (HMI) having a display unit and an input device for the display of signals of the at least one non-safe control apparatus and for the input of parameters for the at least one non-safe control apparatus. In other words, provided in or at the molding facility is at least one operating device, by way of which normal control of the molding facility is effected by an operator in particular in full operation of the molding facility.

An especial area in regard to the controls for molding facilities or peripheral devices for molding facilities concerns in that respect the entire installation, operational commissioning and safety. This means that the step from the manufacturer to the first full operation of the molding facility is effected in as simple fashion as possible and at the same time all safety-technical aspects are taken into consideration.

In that respect in principle in safety technology there are two different ways of ensuring that the entire safety circuitry of the different safety-relevant actuators or safety modules (for example drive controllers, modules with digital and/or analog output/input signals, special modules for example for keeping shut and enabling a protection door, the most widely varying sensors like rotary or positional detectors and so forth) is correct and complies with all safety standards. On the one hand there is here the safety technology which is of a discrete dual-channel structure and on the other hand functional safety technology of a diversitary structure.

A disadvantage with the safety technology which is of a discrete dual-channel structure is that it is necessary to involve a very high level of complication and expenditure for wiring and contact multiplication (for example EMERGENCY-STOP circuits or protective door switching circuits by means of relays for contact multiplication). A further disadvantage is the limited service life of those contacts. Particularly in the case of unknown contact loadings they are to be correspondingly prematurely replaced.

In particular in special installation design engineering however functionally designed safety technology is already encountered, wherein that includes at least one safety control apparatus (safety master) which has at least one safe signal input and at least one safe signal output and in which there is stored a safety program which can be implemented for safe control by means of safety parameters, which can be predetermined by a user, of safety-relevant actuators (safety slaves) of the molding facility or peripheral apparatus. That functional safety is however typically used or produced in the batch size 1 or at least with very small batch sizes. As a result engineering on site is possible and the tooling developed by the suppliers of the functional safety components (toolchain) for operational commissioning and diagnosis is adequate.

The term "functional safety" is used to mean a modern safety control of diversitary structure (briefly: safe control apparatus or secure programmable logic controller (SPLC)) which safely communicates with the safety-relevant actuators distributed in the installation, by way of a signal-transmitting connecting device (for example a preferably safe bus system). In that case both that safe control apparatus and also the non-safe control apparatus are connected to that connecting device. The above-mentioned "safe communication" is secured by various check additions in the form of continuous telegram numbers, check sums, timeouts and so forth and demonstrably safe in accordance with the standards for injection molding machines or handling systems (SILIII in accordance with EN61508 or Category 4 and PLd and PLe in accordance with EN ISO 13489-1). Those details are generally thought of as being adequate after a risk assessment for the present use. The secure programmable logic controller (SPLC) can normally be programmed in a special "safety engineering tool" of the manufacturer. The safety program created by that tool is stored from that tool with a direct connection to the safe control apparatus (or by means of a storage medium to be connected to the safe control apparatus), verified and carried into effect. In a subsequent test run the commissioner (in the factory) or the service technician (in the field) has to verifiably check the safety functions. It is only in that way that the molding facility or the peripheral apparatus can be cleared for use.

It is also possible to use in an installation a plurality of independent safe control apparatuses which then communicate with each other by way of definable interfaces. The individual task portions (for example safety program creation, download, verification, tests and so forth) are then to be appropriately carried out a plurality of times or in automated fashion. The actual creation of the safety program for the secure programmable logic controller (SPLC) must be performed by an engineer familiar with the safety technology—in the "old world" of discrete safety technology these are electrical engineers who define the safety circuitries.

That procedure by way of a "safety engineering tool" is however less useful for a series machine manufacturer. In particular connection of the "safety engineering tool" to the safe control apparatus in the molding facility as well as operation of that generally complex tool with the possibility of implementing alterations for broad use by operational commissioner/service technician is subject to a high level of fault potential or a very great deal of training is required for example in the case of a world-wide roll-out.

In series machine manufacture with significantly larger numbers of items and in particular in the case of world-wide use and servicing and maintenance linked thereto by persons qualified for same a particularly high level of user- and diagnosis-friendliness is an aspect of great value. Such series installations are typically produced in a modular structure so that there is repeatedly the demand for the installations to be modified within defined limits, for example for parts of the installation to be deactivated (by virtue of a fault) or removed because they are required on another installation. While when using discrete safety technology an installation component was to be relatively easily dealt with by unplugging the safety interface and fitting a blind plug bridging over the safety signals, a solution for functional safety systems (diversitary safety technology) is possible nowadays only by way of additional electromechanical selector switches or by importing a new safety program. Both activities are highly specialized and require precise knowledge of the safety documentation so that those activities cannot be performed by personnel who are not especially trained. In particular use of the standard toolchain for the service technician or indeed for the customer is generally unreasonable by virtue of the high degree of complexity. Even a selector switch is often scarcely accessible for someone who is not an electrical engineer because it is fitted in the electrical cabinet and because the documentation in the best-case scenario is in a wiring diagram on the machine.

By definition wiring diagrams are intended to represent the switched-off power-less situation of the machine or installation. Wiring diagrams belong to the functionally related documents in accordance with DIN EN 61082. Those plans are produced at the beginning of the drafting of an installation or machine and are also later required for repair and maintenance operations. Wiring diagrams necessarily include the electrical safety devices.

In the case of functional safety technology also it is expedient to represent the safety circuitry which is no longer electrical in the wiring diagram as it can generally be carried out by the already trained group of electrical designers.

It is state of the art that the electrical designer or a further designer has to produce a further representation of that safety circuitry in the engineering tool of the supplier of the safety control arrangement at the time of manufacture. In that case those two representations generally do not turn out to be identical. For that reason further processing is also susceptible to error and represents an additional amount of work. Furthermore commissioning is also made more difficult due to the two representations and a number of specialists are required for correcting faults, which in turn is very costly.

Hitherto in the state of the art for the selection of safety options there are no programming options for intervening in the function of the safety program, that the electrical engineer can define in the wiring diagram. That is to say, it is not possible to react to missing components (for example commissioning without a robot) or defective components (for example operation of the machine without robot with machine safety guard when the robot door is defective). In addition there would be a wish in that respect to have for example the hand operating device only in the process setup phase and then to be able to remove it from the molding facility again. For those and similar cases a special safety program would always have to be maintained. It is already realized that there may certainly be many of these. The choice of special configurations by way of safe hardware selector switches is also problematical and less user-friendly.

SUMMARY OF THE INVENTION

The object of the present invention is therefore to provide a molding facility which is improved over the state of the art and an improved peripheral apparatus for a molding facility and an improved process. In particular the invention seeks to provide that the listed problems are obviated as much as possible.

That is achieved by a molding facility or by a peripheral device for a molding facility according to the present invention. Accordingly, in accordance with the invention it is provided that the safety program is a version of a wiring diagram, that can be executed by the safe control apparatus and is compiled by a compiler. To produce the compiled version of the wiring diagram the same library of symbols that the engineering tool of the supplier of the safe control apparatus uses is ideally used in the wiring diagram. The same applies also for the safety parameters associated with each symbol. In the next step the individual symbols are exported with the associated safety parameters, the connections of the symbols to each other and the connections to the safe signal inputs and outputs in a structured data format (for example XML). In the next step the data file (for example XML data file) which is present in the structured data format is imported into the engineering tool where the compiling operation is initiated by a compiler of the engineering tool. After the conclusion of the compiling operation the compiled version of the wiring diagram (for example by means of software generators on a script basis or by manual copying of the data file) is stored in the form of a safety program which can be executed by the safe control apparatus, for example by a safety loader.

Preferably such storage can be effected by way of the non-safe control apparatus as an intermediate station, in which respect generally jointly with the compiled version of the wiring diagram the non-safe parts of programs are communicated to the non-safe control apparatus.

In other words an improvement in the state of the art is achieved by virtue of the fact that the safety circuitry is carried out as previously by the electrical engineer in his accustomed environment in an ECAD tool (electronic computer-aided design). That circuitry (wiring diagram) is imported from the ECAD tool by suitable conversion (compiling) into the safety engineering tool and the necessary safety program is created (ideally by clicking a button). That program is now applied to the desired installation by way of existing automatisms of software production. For that purpose the installation software in accordance with a preferred embodiment is expanded by an additional tool in the form of a loader device (referred to as a safety loader) which by way of simple dialogs checks the safety program for reliability, selects it and stores it on the connected SSPC or verifies that procedure and thereafter implements it. For that purpose the functions previously contained in the safety engineering tool are extracted into the safety loader.

The safety loader is further enlarged by customizing functions. In that way the authorized user is enabled to execute given prepared variants of the safety program. Such a variant could permit operation of the machine (without robot) without robot protection door with a simultaneously closed machine guard or could permit unplugging of a hand operating device. Now it is comparatively simple to make changes in the safety behavior—there is no longer any need to import a new safety program, which would have the consequence that all functions would have to be freshly tested.

Naturally the safety loader present on the installation together with stored safety program and possibly further items of information from the safety program creation afford the possibility of making further functions available. An obvious expansion is diagnosis of the safety program by display of (animated) signal states in the program logic, displaying error codes and so forth. In that respect an aim is to represent the program logic based on the familiar form from the ECAD.

In accordance with a preferred embodiment there is provided a computing unit on which there is configured a user interface with a display unit and an input device for the display of signals of the at least one non-safe control apparatus and for the input of parameters for the at least one non-safe control apparatus. It can further be provided in that respect that the safety program can be executed by means of safety parameters which can be predetermined by a user by way of the input device of the user interface of the computing unit. Here it can be provided that the computing unit is physically identical to the non-safe control apparatus.

It is particularly preferably provided that the safety parameters for the safety program of the safe control apparatus can be input by way of the input device of the user interface of the computing unit. In that way it is now possible to operate the safe control apparatus by way of the input device, which per se is already present, of the user interface, and to input the corresponding safety parameters for the functional safety technology of a diversitary structure. This means that safety checking no longer has to be effected by way of a separate safety program which is installed only for commissioning in an expensive situation. Rather it is preferably provided that the safety program can be verifiably installed on the safe control apparatus by way of the input device of the user interface of the non-safe control apparatus.

Particularly preferably it is now possible, by way of the "normal" user interface (operating device), by means of the safety parameters for the safety program of the safe control apparatus, to select the number and/or positioning of the safety-relevant actuators or the predetermined safety level of at least one safety-relevant actuator.

The safety program is typically also of a modular nature—like generally in the case of the functional safety technology of a diversitary nature. Thus it is relatively easily possible to simulate the modular functional extent. That can be used in such a way that the interfaces present between the functions may be set to precisely defined signals upon removal of an equipment component (actuator). For example the "EMERGENCY STOP" signal of a removed protective door can be set to okay while the "guard closed" signal of the same removed door must be set to defective. Ultimately this is precisely that function which in the discrete case the U-link plug has taken over.

The next step is now that it is possible to activate or deactivate that virtual link plug (or it could also be referred to as the "safety option") on the installation operating terminal (input device of the user interface). That gives the advantage that the typically present infrastructure can be used in the form of a user access system (login), status displays and fault messages for diagnosis purposes or documentation (loggings). This means that the concept of a single-point-of-operation is also retained for those service activities.

A further optional possibility is that the alterations by virtue of the switching of safety options also initiate the corresponding checking measures as it is generally indispensible to verify the functionalities after changes to the safety technology. Altered interface signals can be tested in deliberately targeted fashion by corresponding knowledge of the signal actions of the interfaces on the actuators. There is no need for all safety functions of the entire installation to be freshly checked. Thus it is sufficient to test that sliding guard which in parallel relationship with the removed protective door prevents access to a danger zone and there is also no need to check still further protective doors which were already verified. In that way it is possible to construct a smart system and upon alterations the operator is interactively guided by the necessary verifications (guided commissioning). All those activities can in turn be documented with the dates of the logged-in user.

In other words it should be stated generally once again that the safety program is associated with the safe control apparatus and is executed on the runtime system thereof and executes operation of the safety-relevant actuators in a predefined (or also partially adjustable) fashion. The individual safety-relevant actuators (safety program elements) are linked together by way of the signal-transmitting connecting device and communicate by way of the safe signal inputs and outputs. Safety parameters (for example watchdog times, safe speeds and so forth) are used for the communication. The safety program also has predetermined configuration options which can be selected by a user by way of the user interface and represents adaptation to a variable operating situation (=not constantly present safety function for example of a guard door or temporary limitation in the form of working or blocking regions) of the actuators or the molding facility.

Preferably in accordance with an embodiment it is provided that a diagnosis tool for the at least one safe control apparatus is implemented in the user interface of the non-safe control apparatus.

To be able to guarantee clarity for an operator it is preferably provided that the display unit of the user interface is configured for representing diagnosis signals of the diagnosis tool in the form of a wiring diagram. For simple and comfortable operability it is preferably provided for that purpose that the display unit of the user interface is configured for the individual representation of a block or a group of blocks of the electrical plan (wiring diagram), wherein the input device of the user interface is configured for the change between the individual representations in accordance with a signal flow direction of the wiring diagram. A block can be a conventional switching element or a function of a safety program. The individual safety-relevant actuators can also be represented based on the wiring diagram by way of the display unit. Stepwise navigation is also possible between those represented safety-relevant actuators (also by way of a plurality of display screen pages) corresponding to the signal flow direction by way of a simple user action. It is also possible to implement an independent diagnosis option for communication between the safety master and the at least one safety slave. In addition there can be an overview representation on a display screen page, wherein all safe control apparatuses (safety master), all safety-relevant actuators (safety slaves), the safety program and/or the user configuration are displayed.

A further forward-looking function is a didactically supported commissioning of the safety program. In that case the logic states can be monitored during the commissioning process and thus the program regions which are tested or which are still to be tested can be characterized. For that purpose the diagnosis tool is preferably configured to test a signal connection, which includes a plurality of blocks, of the wiring diagram and mark already tested blocks. That ensures that all program regions are also actually tested (similarly in the programming of code coverage). In addition that test phase should be automatically protocolled (user, date and clock time, tested function). Only the actually necessary partial regions from the "safety engineering tool" are integrated with the described expansions in the installation software. Value was intentionally put on intuitive operation and functions which are not necessary (possibility of alteration for the safety program) are dispensed with. Thus the complexity can be controlled even for inexperienced operators or in the event of only sporadic use.

Particularly advantageously it is now possible to establish with the diagnosis tool whether an input signal at at least one safe signal input of the safe control apparatus triggers a predetermined output signal by way of the at least one safe signal output of the safe control apparatus. Hitherto it was only possible to indirectly deduce the operability of the signal, for example by whether an actuated motor was actually switched on or off. Now that is effected by directly testing the signal output. At the same time it is preferably possible for the diagnosis tool to monitor the complete signal path between the at least one safe signal output and the at least one safe signal input.

Two different variants are possible in regard to the configuration in principle of the safe control apparatus. On the one hand the at least one safe control apparatus can be in the form of a component which is physically separate from the non-safe control apparatus or on the other hand it can be implemented directly in the non-safe control apparatus. In principle a hybrid form is also conceivable. According to an embodiment it can be provided that the software running on the non-safe control apparatus is subdivided into a main application and a service application functioning as the safe control apparatus, wherein switching over between the two is effected transparently. In that respect configuration of the safety program can be effected in the main application or in the service application. In addition one possibility of transmission (=download for example by the safety loader) of the at least one safety program into the safety master runtime environment and/or checking of the safety program performed by the safety master runtime environment for identity (=verification for example by the safety loader) can be effected in the main application or in the service application.

Two examples are set forth hereinafter in regard to the configuration options. If a guard protection door programmed in the safety program is not present as an actuator that is described by way of the configuration options in the safety program by substitute signals. If a guard protection door programmed in the safety program (non-safety-relevant actuator) and the safety slave controlling that guard protection door (safety-relevant actuator) is not present in the molding facility, both are described by way of the configuration options in the safety program by substitute signals.

Access to the safe control apparatus is preferably granted only by way of a suitable authorization device. In that case authentication (login) of the user can be effected by way of the input device of the non-safe control apparatus, the user inputting a user name and a password. Authentication however can also be effected by way of a suitable interface like for example an RFID chip, a magnetic card, a chipcard, a transponder, an optical system, a bar code, a QR code and so forth. There may also be an additional safety barrier implemented in the user interface, by access to the safe control apparatus being safeguarded by a separate additional password. In that way an operator responsible for normal operation cannot effect any alterations in the safe control apparatus and its safety program.

The internal structure of the safe control apparatus is preferably such that the at least one safe control apparatus uses at least one core of the computing unit of the non-safe control apparatus, which communicates by way of a bus with the at least one safe signal input and the at least one safe signal output. The safe control apparatus can however also run on a completely independent CPU.

For checking or monitoring the entire safety-relevant procedures it is preferably provided that an input of safety parameters for the safe control apparatus, that is effected by way of the input device of the user interface of the non-safe control apparatus, can be deposited in a protocol data file. Alterations at or in the safety program itself are also protocolled. In addition configuration alterations can be protocolled.

In principle there can be provided a plurality of safe control apparatuses. In that case it is possible to exchange defined interface signals cyclically between a respective safety master and a second safety master functioning as a safety slave.

In regard to commissioning and the safety checking linked thereto automated tests (controlled safety commissioning) are carried out. In that case it can preferably be provided that in addition there is support for performing functional tests in the form of their own display screen contents. That is effected in particular by a test list to be processed, in which respect the test results occurring and the test points which are still open are represented. It can further be provided in that respect that the reaction to the user interaction (triggering sensor or altering configuration) is automatically checked and transferred into the test result. It can also be provided that implementation of the desired reaction is checked by the state of one or more safety-relevant actuators. Thus, the motors do not have to be switched on/off at each EMERGENCY STOP. It can also be provided that the tests performed and the detected alterations linked thereto in the signal and program states are used for representation in the form of a code coverage view on the one hand and for checking the completeness of the test. For safe operation it is provided that only the restricted operation of the installation/component with reduced operating values is allowed as long as not all tests were successfully performed (=reduced speed, no AUTOMATIC operation and so forth). That means conversely that the unrestricted operation of all actuators of the molding facility is allowed only after complete performance of all tests and by a protocolled operator. As a further safety stage it can be provided that the exchange of components from the molding facility, which are recognized by altered serial or batch numbers, requires repetition of tests and in turn activates the restricted operation mode.

In regard to the computing unit it can be provided according to an embodiment that the user interface is connected to the computing unit by way of a remote access. This means that the operator is not place-bound and can thus perform a remote installation or safety check. It can be provided that the molding facility or peripheral apparatus does not have a permanent user interface but one is connected as required.

BRIEF DESCRIPTION OF THE DRAWINGS

Further details and advantages of the present invention are described more fully hereinafter by means of the specific description with reference to the embodiments by way of example illustrated in the drawings in which.

DETAILED DESCRIPTION OF THE INVENTION

Figure 1:
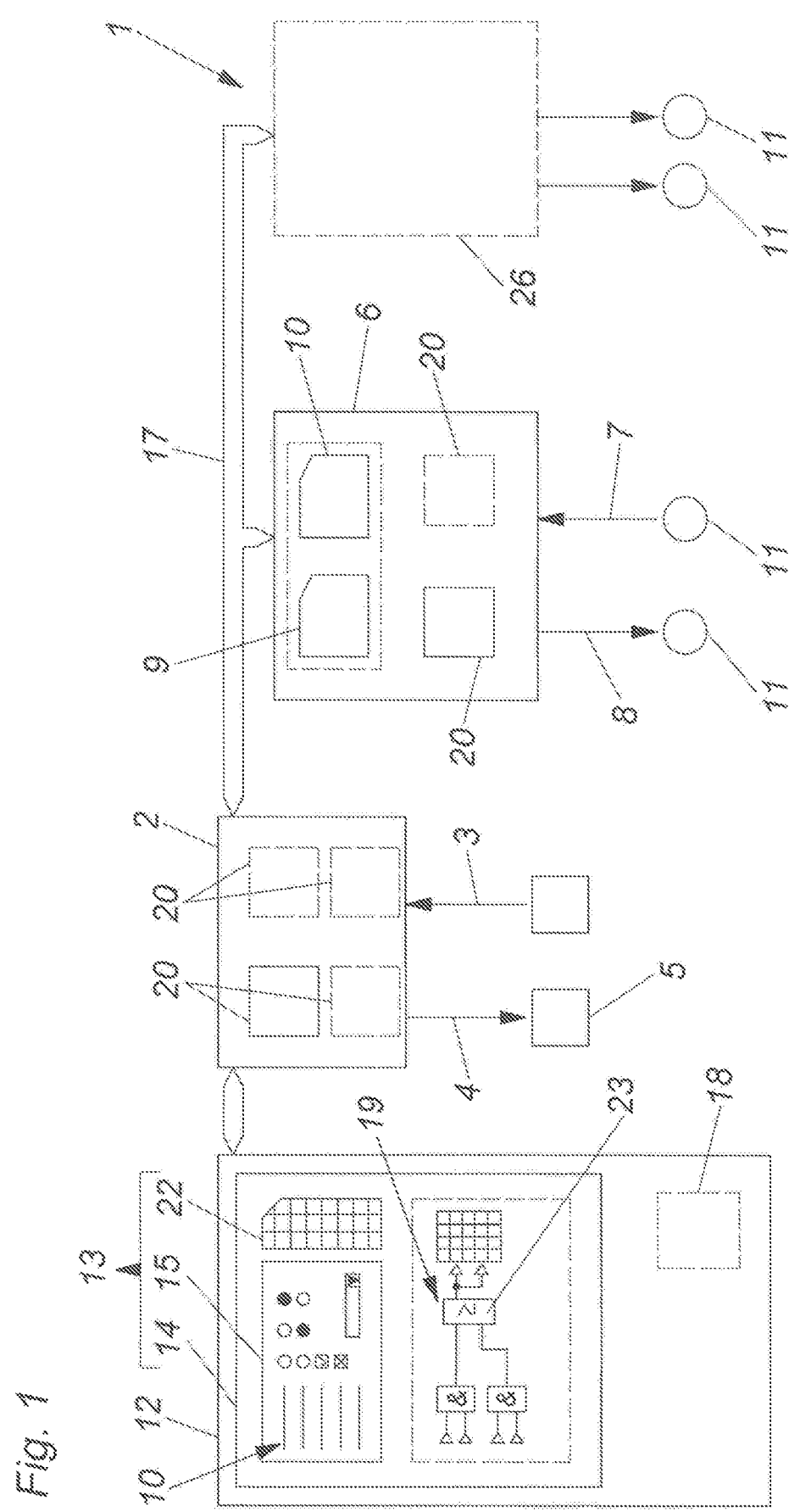
FIG. 1 diagrammatically shows the essential control-engineering components of a molding facility, FIG. 2 diagrammatically shows a wiring diagram.

FIG. 1 diagrammatically shows the essential control-engineering components of a molding facility 1 (for example an injection molding installation) or a peripheral device of a molding facility 1. Like per se any molding facility 1, this molding facility 1 also has a computing unit 12 which forms the basis of a user interface 13 (operating device). That user interface 13 in turn is composed of the display unit 14 (display screen) and the input device 15 (keyboard, mouse and so forth). Optionally the display device 14 and the input device 15 can be in the form of a component in the form of a touchscreen. The non-safety-relevant actuators 5 are moved by an operator in normal operation by way of the user interface 13 and the computing unit 12. Examples of such non-safety-relevant actuators 5 are conveyor belts, injection assemblies, doors, handling robots, ejectors, core pullers and many more. The non-safe control apparatus 2 is provided for the control of those movements. Parameters are input or selected by way of the input device 15 of the user interface 13 and corresponding signals are passed to the non-safe control apparatus 2. From that in turn corresponding signals are output by way of the signal-transmitting connecting device 17 (bus system) and by way of the signal output 4 and go to the non-safety-relevant actuators 5 whereby they are moved in accordance with the parameters. A return message to the non-safe control apparatus 2 is afforded by way of the signal input 3. A previously known control system of a molding facility 1 also functions in that way.

Now, as already discussed, in particular for operational commissioning of a new molding facility 1 or when adding or removing non-safety-relevant actuators 5, there are additional prescribed safety checks so that after successful checking of the molding facility 1, full operation can be implemented. In that respect a procedure in the form of a so-called diversitary functional safety technique has been more and more adopted in recent years. An additional secure programmable logic controller (SPLC) is used for that purpose, by way of which the safety-relevant actuators 11 of the molding facility 1 are checked. Safety-relevant actuators 11 of that kind are for example drives, IO-modules, protective door modules, sensors and many more. With such a safe control apparatus 6 an operator checks the operability, the number and the safety level of the safety-relevant actuators 11 which are present or necessary. In that respect however in the specific application various problems arise in regard to the complexity and in particular in regard to the time involvement, in particular when in modern molding facilities 1 refitting of various actuators 5 is effected relatively often. Further disadvantages have already been set forth hereinbefore.

To obviate those disadvantages it is provided that the safe control apparatus 6 is operable by the computing unit 12 which is already present and its user interface 13. Accordingly safety parameters 10 are input or selected by way of the input device 15 of the user interface 13 whereupon corresponding signals are passed to the safe control apparatus 6. Stored in that safe control apparatus 6 is a safety program 9 which can be performed for safe control of the safety-relevant actuators 11 by means of the safety parameters 10 predetermined or selected by the user. More especially an output signal produced by the safety program 9 is communicated by way of the signal output 8 and/or by way of a safe bus module 26 to the at least one safety-relevant actuator 11. In order to permit checking by the safe control apparatus 6 a reaction is effected by the at least one safety-relevant actuator 6, said reaction being communicated in the form of an input signal by way of the signal input 7 to the safe control apparatus 6. The safe control apparatus 6 itself can have one or more cores 20 for computation purposes. That at least one core 20 is connected to the signal output 8 and the signal input 7 of the safe control apparatus 6. It can however also be provided that the computing unit 12 has one or more cores (CPUs), in which case the non-safe control apparatus 2 and/or the safe control apparatus 6 can run on one or more of those cores.

In addition a diagnosis tool 18 is implemented in the safe control apparatus 6 and/or in the computing unit 12—as illustrated. The individual safety-relevant actuators 11 can be tested for their operational capability along the signal flow direction by way of that diagnosis tool 18, preferably in succession. In order to make that also traceable for an operator a wiring diagram 19 corresponding to the circuitry of the safety-relevant actuators 11 is represented on the display unit 14. That wiring diagram comprises individual blocks 23 or groups of blocks. By virtue of that display of a wiring diagram 19 it is also quickly possible to detect which block 23 or which safety-relevant actuator 11 is functioning. That can be signaled to the operator by a corresponding marking or emphasis.

For further enhancing the safety level there can also be provided an authorization device, by way of which an operator logs in. In addition, for subsequent checking, each input by way of the input device 15 can also be stored in a protocol data file 22.

Figure 2:
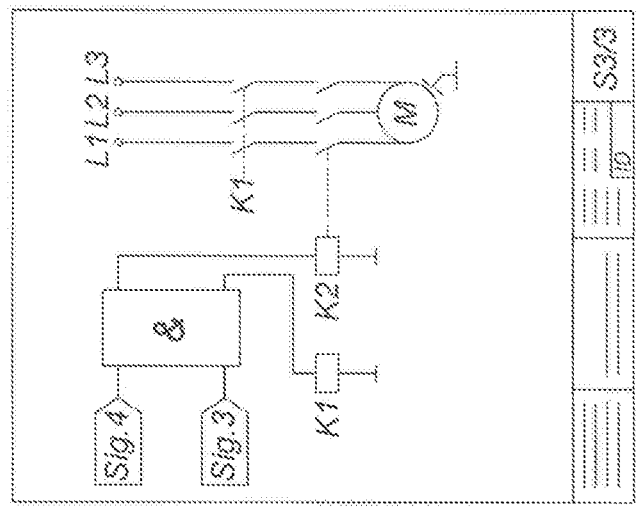
Figure 2:
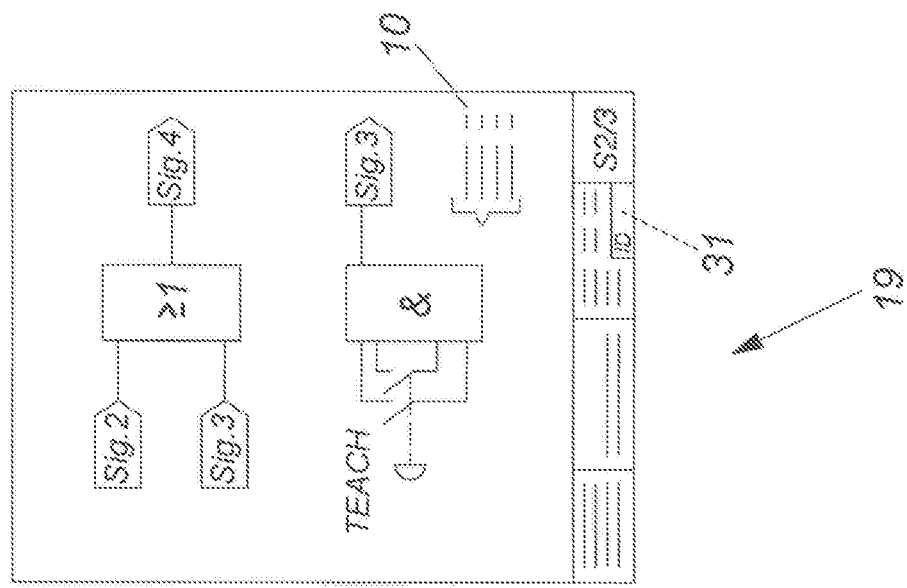
Figure 2:
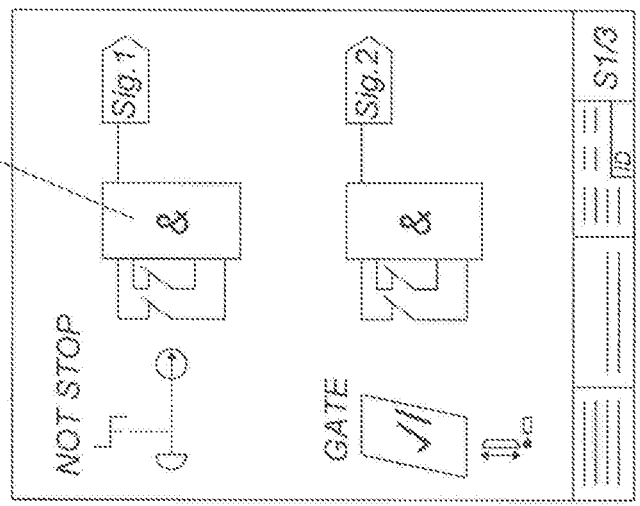

FIG. 2 shows an example of a wiring diagram 19 which is known per se to the man skilled in the art and which is here divided to three display screen pages of the display unit 14.

Figure 3:
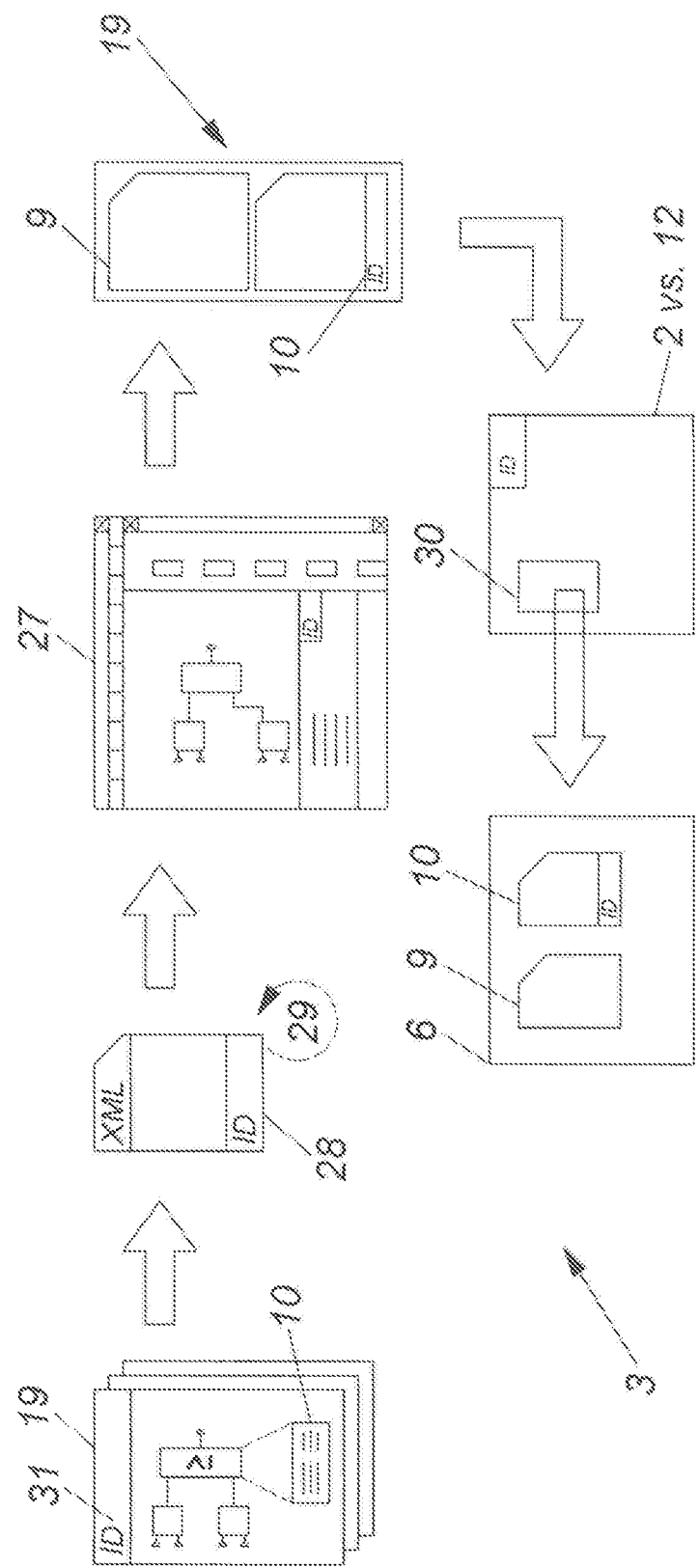
FIG. 3 shows a flow chart with compiling of the wiring diagram.

FIG. 3 shows how, starting from the wiring diagram 19 shown in FIG. 2, a compiled version of the wiring diagram 19 is produced. In a first step an export data file 28 (here XML data file) is produced from the wiring diagram 19, which here can also be enriched or reduced by items of information 29. In the next step the XML data file is imported into the engineering tool 27 where the compiling operation is initiated by a compiler of the engineering tool 27. After the termination of the compiling process the compiled version of the wiring diagram 19 and the safety parameters 10 are stored by means of the safety loader 30 in the safe control apparatus 6 in the form of a safety program 9 which can be executed by the safe control apparatus 6. As can be seen from FIGS. 2 and 3 in the representation of the wiring diagram 19 a stored identification 31 of the molding facility 1 or the peripheral apparatus for the molding facility 1 is stored, preferably in the form of a fabrication number, so that it is possible to prevent confusion in respect of the safety program 9.

In the illustrated embodiment once again it is possible by means of the described approaches to achieve a very similar installation workflow as with the discrete technology. Additional benefit is achieved however in particular by the ease of operation by way of the user interface of the non-safe control apparatus. In addition convenient diagnosis and structured functional testing are possible. Accordingly the complication and expenditure for construction and commissioning of safety functions can even be reduced. That is of great advantage in particular in special machine construction and for complex installations. Often it is precisely commissioning which in the conventional case takes up a very great amount of time and is difficult to plan.

In the illustrated embodiment the safety function can further be produced in the ECAD and automatically put on to the safe control apparatus with the assistance of the manufacturer-specific safety engineering tool and a safety loader which is integrated on the installation. That way is extremely efficient both in commissioning in an in-house situation and also in the field (sending the safety program by way of e-mail etc). An optimized installation workflow which is more efficient than the discrete workflow is afforded by automation of the steps and additional accompanying measures like the input of safety parameters, diagnosis, guided commissioning and documentation, and complexity is reduced.

The invention claimed is:

1. A system comprising:
   non-safety-relevant actuators,
   at least one non-safe control apparatus having at least one signal input and at least one signal output for non-safe control of the non-safety-relevant actuators of the system,
   safety-relevant actuators,
   at least one safe control apparatus which has at least one safe signal input and at least one safe signal output and in which there is stored a safety program which can be executed for safe control of the safety-relevant actuators of the system,
   a safety engineering tool in which the safety program for the at least one safe control apparatus can be programmed, wherein the safety program created by the safety engineering tool is stored either from the safety engineering tool with a direct connection to the at least one safe control apparatus or by a storage medium to be connected to the at least one safe control apparatus,
   an electronic computer-aided design tool in which a wiring diagram is created during a design phase of the system, wherein the wiring diagram represents an electrical circuit and comprises individual symbols with associated safety parameters, connections of the individual symbols to each other and connections to the at least one safe signal input and the at least one safe signal output, wherein a same library of individual symbols and associated safety parameters to be used by the safety engineering tool of the at least one safe control apparatus is to be used in the wiring diagram, wherein the individual symbols of the wiring diagram are illustrated in a switched-off power-less situation such that the wiring diagram represents the switched-off power-less situation of an entirety of the system, and wherein the wiring diagram includes individual symbols of the safety-relevant actuators and the non-safety-relevant actuators therein, and
   an exporting device configured to produce an export data file from the wiring diagram and by which the export data file is to be imported into the safety engineering tool,
   wherein the safety engineering tool comprises a compiler by which a compiling operation of the export data file is to be initiated and a compiled version of the wiring diagram is to be generated, and
   wherein the safety program is a version of the wiring diagram that during operation of the system is executed by the at least one safe control apparatus, thereby safe controlling the safety-relevant actuators as defined in the compiled version of the wiring diagram.

2. The system as set forth in claim 1, further comprising at least one signal-transmitting connecting device to which the at least one non-safe control apparatus and the at least one safe control apparatus are connected.

3. The system as set forth in claim 2, wherein the at least one signal-transmitting connecting device is a bus.

4. The system as set forth in claim 1, further comprising a computing unit on which there is configured a user interface with a display unit and an input device for display of signals of the at least one non-safe control apparatus and for input of parameters for the at least one non-safe control apparatus.

5. The system as set forth in claim 4, wherein the safety program can be executed by safety parameters which can be predetermined by a user by the input device of the user interface of the computing unit.

6. The system as set forth in claim 5, wherein the safety parameters for the safety program of the at least one safe control apparatus can be input by the input device of the user interface of the computing unit.

7. The system as set forth in claim 5, wherein:
   a number and/or a positioning of the safety-relevant actuators or
   a predetermined safety level of at least one of the safety-relevant actuators
   can be selected by the safety parameters for the safety program of the at least one safe control apparatus.

8. The system as set forth claim 1, wherein the safety program can be verifiably installed on the at least one safe control apparatus by an input device of a user interface of the at least one non-safe control apparatus.

9. The system as set forth in claim 1, wherein a diagnosis tool for the at least one safe control apparatus is implemented in a user interface of the at least one non-safe control apparatus or in the at least one safe control apparatus.

10. The system as set forth in claim 9, wherein a display unit of the user interface is configured to represent diagnosis signals of the diagnosis tool in the wiring diagram.

11. The system as set forth in claim 10, wherein the display unit of the user interface is configured for individual representation of a block or a group of blocks of the wiring diagram.

12. The system as set forth in claim 9, wherein the diagnosis tool is configured to test a signal connection of the wiring diagram that includes a plurality of blocks, and to mark already tested blocks.

13. The system as set forth in claim 9, wherein the diagnosis tool is configured to establish whether an input signal at the at least one safe signal input of the at least one safe control apparatus triggers a predetermined output signal by the at least one safe signal output of the at least one safe control apparatus.

14. The system as set forth in claim 13, wherein the diagnosis tool is configured to monitor a complete signal path between the at least one safe signal output and the at least one safe signal input.

15. The system as set forth in claim 1, wherein the at least one safe control apparatus is a component physically separated from the at least one non-safe control apparatus or is implemented in the at least one non-safe control apparatus.

16. The system as set forth in claim 1, wherein the at least one safe control apparatus is configured to communicate by a safe bus module with the at least one safe signal input and/or the at least one safe signal output.

17. The system as set forth in claim 1, wherein an input of safety parameters for the at least one safe control apparatus, that is effected by an input device of a user interface of the at least one non-safe control apparatus, can be deposited in a protocol data file.

18. The system as set forth in claim 1, wherein an input of safety parameters for the at least one safe control apparatus can be limited to values already provided in the wiring diagram, by an input device of a user interface of the at least one non-safe control apparatus.

19. The system as set forth in claim 1, wherein an identification additionally deposited in the wiring diagram with respect to the system is deposited, and is taken over into the safety program which can be executed by the at least one safe control apparatus so that confusion with respect to the safety program can be prevented.

20. A method of operating a system, comprising:
non-safety-relevant actuators,
at least one non-safe control apparatus which by input and output signals non-safely controls the non-safety-relevant actuators of the system,
safety-relevant actuators,
at least one safe control apparatus which by input and output signals by a safety program safely controls the safety-relevant actuators of the system,
the method comprising:
programming a safety program for the at least one safe control apparatus by a safety engineering tool, wherein the safety program created by the safety engineering tool is stored either from the safety engineering tool with a direct connection to the at least one safe control apparatus or by a storage medium to be connected to the safe control apparatus,
generating a wiring diagram during a design phase of the system in an electronic computer-aided design tool, wherein the wiring diagram represents an electrical circuit and comprises individual symbols with associated safety parameters, connections of the individual symbols to each other and connections to the input and output signals of the at least one safe control apparatus, wherein a same library of individual symbols and associated safety parameters to be used by the safety engineering tool of the at least one safe control apparatus is to be used in the wiring diagram, wherein the individual symbols of the wiring diagram are illustrated in a switched-off power-less situation such that the wiring diagram represents the switched-off power-less situation of an entirety of the system, and wherein the wiring diagram includes individual symbols of the safety-relevant actuators and the non-safety relevant actuators therein,
generating an export data file from the wiring diagram,
importing the export data file into the safety engineering tool,
initiating and conducting a compiling operation of the export data file in a compiler of the safety engineering tool for creating a compiled version of the wiring diagram, and
storing the compiled version of the wiring diagram as the safety program which during operation of the system is executed by the at least one safe control apparatus, thereby safe controlling the safety-relevant actuators as defined in the compiled version of the wiring diagram.

21. The method as set forth in claim 20, wherein the system is a shaping installation or a peripheral apparatus for a shaping installation.

22. The system as set forth in claim 1, wherein the system is a shaping installation or a peripheral apparatus for a shaping installation.

* * * * *